United States Patent Office 2,915,567
Patented Dec. 1, 1959

2,915,567

REACTOR COOLANT AND METHOD OF USE

James R. Wright, El Cerrito, and Robert O. Bolt, San Rafael, Calif., assignors, by mesne assignments, to the United States of America as represented by the United States Atomic Energy Commission No Drawing. Application July 23, 1956
Serial No. 599,353

5 Claims. (Cl. 260—666.5)

The present invention relates to cooling nuclear reactor and pertains more particularly to improved coolants having superior properties and their use to cool reactors and/or reactor components, e.g., moderators, reflectors, fuel elements, etc.

Since a reactor is a constant and continuing source of heat, coolant means are provided for removing such heat so that it can be used effectively to produce useful power. In reactors the liquid coolant is made to contact the fuel elements, the substance containing the fuel, or other reactor components such as the moderators or reflectors. Often the coolant in the reactor transfers its heat in a heat exchanger to a second coolant which then carries the heat to the power generating point. Such primary and secondary coolants are conveniently used to remove heat from the reactor while limiting the regions where radioactive materials must be handled. Since the higher the temperature the more efficient the over-all reactor power plant, coolants are most suitable when they are able to withstand very high temperatures. Apparently the minimum temperature desired for operation of a reactor plant is of the order of 400° C. Hence the coolant must withstand such temperatures for appreciable times and radiation dosages.

Heretofore, water has been proposed and used as a reactor coolant. However, it has the disadvantages of corroding metals of construction, of possessing a high vapor pressure at the operating temperatures encountered, particularly in high temperature nuclear reactors, and of becoming radioactive on exposure to neutrons. Liquid metals have also been proposed as coolants for high temperature nuclear reactors. However, the handling of the liquid metals such as sodium and potassium is hazardous and comparatively difficult. The alkali metals, e.g., sodium, potassium and lithium, are extremely active chemically. Other liquid metals, such as lead and lead-bismuth, are corrosive to many high temperature structural metals.

As compared to water and liquid metals, certain polynuclear aromatic hydrocarbon compositions have superior properties as reactor coolants, whereby the disadvantages entailed in the use of these prior coolants are minimized or avoided. Thus, the polynuclear aromatic hydrocarbon coolants are not normally corrosive to metals or other materials contacted in a nuclear reactor system. Also, these aromatics, and particularly the polyphenols, are more resistant than other organics to deterioration by the combined action of elevated temperatures and nuclear irradiation. They have desirable high thermal conductivity and high heat capacity and are liquids of suitable viscosities at the operating temperatures.

For plant efficiency, the skin and bulk temperatures of the coolant for the reactor or reactor moderator should be as high as possible; hence the tendency of the coolant to coke at the point of heat transfer and thereby to decrease the efficiency of heat transfer is disadvantageous.

While increases in viscosity are not especially disadvantageous with respect to increased pumping difficulties, an increase in viscosity of a hydrocarbon coolant on irradiation indicates polymerization and hence a tendency toward incipient coking. As compared to other organics, the polynuclear aromatic hydrocarbons have a lesser tendency to coke and to form deposits in heat exchanger tubes.

Another important advantage of these compositions is that they have a low vapor pressure which allows a reduction in the size and cost of the nuclear reactor pressure vessels. Furthermore, the mixed polyphenyls have a low residual radioactivity from neutron capture and hence are suitable for primary or secondary coolants. This last advantage permits a minimum of coolant shielding external to the primary nuclear reactor shielding.

It has been found that, whereas certain polynuclear aromatic hydrocarbons such as polyphenols, have greater resistance, as compared to other organic materials, to deterioration induced by exposure to neutron irradiation at elevated temperatures, such resistance can be even further improved by the incorporation therein of certain metal-free aromatic inhibitor materials capable of forming stable free radicals through extensive resonance.

Although applicants do not wish to be bound by any theory, the effectiveness of such additives may follow from their interference with the decomposition mechanism. According to the mode of radiation-induced decomposition of organic materials postulated by Burton (Journal of Physical and Colloid Chemistry, vol. 51, p. 786; 1947), ionization takes place first, followed by ionic discharge and decomposition. The last step may result in a stable molecule or a free radical. The present additives may permit increased life of the molecule in an excited state, thus giving a greater chance for collisional deactivation. The present inhibitors include phthalocyanine, triphenylmethane and naphthacene. The structural formula for metal-free phthalocyanine is as follows:

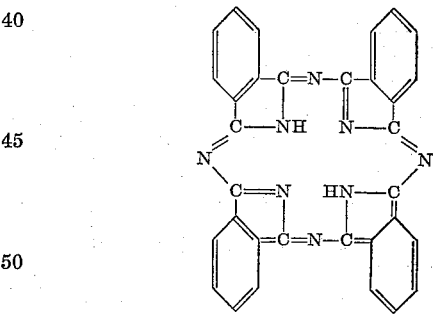

The free radicals generated in situ by the above compounds are stable possibly because of the large number of resonance structures contained therein.

The additives of the invention are used in small amounts, normally less than 10% but more than 0.1%, especially from about 0.5% to 5%. Sometimes larger amounts can be used to impart improved properties.

Suitable polynuclear aromatic hydrocarbons include the preferred nonfused ring class of polyphenyls such as biphenyl, meta-terphenyl, orthoterphenyl and paraterphenyl, and the various quaterphenyls and the fused ring aromatics such as naphthalene, anthracene, phenanthrene and binaphthyl. The polynuclear aromatic materials are preferably substantially free of both halogenated materials and impurities such as those which would cause detrimental coking and decreased heat transfer. The presence of nonaromatic substituents such as alkyl groups tends to reduce the stability of neutron radiation and heat and hence the preferred poly nuclear aromatic compounds are generally free of such substituents. Furthermore, the polynuclear aromatic mixtures are substantially free from halogenated material, particularly chloro and fluoro compounds which generate very corrosive products in a nuclear radiation environment at elevated temperatures. Because of their greater stability under the combined action of neutron irradiation and heat, preferred are mixtures of polynuclear aromatic hydrocarbons, initially substantially free of polynuclear aromatic hydrocarbons of more than 4 aromatic rings per molecule, as described in co-pending application, filed concurrently herewith, Serial No. 599,352, in the names of B. J. Fontana, J. R. Wright and R. A. Bolt for a "Method of and Composition for Cooling Nuclear Reactor Systems."

Although, as indicated above, the polynuclear aromatic hydrocarbons prepared for use in accordance with the present invention are free of substantial amounts of compounds having more than 4 aromatic rings, the components of these compositions tend to polymerize upon exposure to nuclear radiation. The compositions in use can develop a polymer content up to about 30–40% before deleterious deposition becomes sufficiently large to require purification and/or replacement. To illustrate, biphenyl develops about 30% polymer per dosage of $10^{18}$ fast neutrons (i.e., above 0.5 ev.)/cm.$^2$.

The presence of other additives in the present composition may be objectionable, especially when these other additives adversely react with components of the mixture or are themselves undesirable in the particular nuclear radiation environment in which they are used. In some instances, where the temperatures are not excessive (such as in a secondary coolant) or where radioactivity of the coolant due to additives and the size of the required secondary shielding are not critical, other additives may be incorporated in the present polynuclear aromatic hydrocarbon compositions.

In the following examples given by way of illustration of the present invention, the change in viscosity, and the amount of coking or tendency to form coke are used as indexes of damage. As a criterion of viscosity change, $\eta_1$ (or $\eta_{10}$) is used and is defined as the viscosity of an irradiated fluid at the temperature, $T_1$ (or $T_{10}$) at which the viscosity of the starting material was 1 centistoke ("cs.") (or 10 cs.). By this index the initial viscosity of each fluid ends at 1 cs., and the viscosity change can be measured in terms of deviation from this common point. Gas evolution is expressed as milliliters (ml.) of gas (measured at 0° C. and 1 atmosphere) generated per milliliter of fluid charged. Coke is defined as the relatively infusible and/or nonvolatile fraction of the pyrolysis and radiolysis residues. In many cases coke is estimated from the simple manual recovery of the sample. The percent liquid, quoted in the tables, represents liquid saturated with respect to the solid phase at room temperature. In some cases a simple, one-stage, high vacuum distillation was performed to separate coke from the volatile solid fraction. Treatment in the latter separation was for one hour at 315° C. at about 1 micron pressure. The amount of coke is a good index of the amount of the deposition tendency on heat transfer surfaces.

EXAMPLE I

Stainless steel capsules of 22 ml. capacity were charged at room temperature with 10 ml. of the sample being tested. All the samples were blanketed with helium to exclude oxygen, because of the harmful effect of this agent on organic materials in the presence of radiation. The capsules were then sealed and 16 capsules (8 deep and 2 across) were placed in an oven which was inserted in a reactor. Automatic temperature control was provided. The temperature was indicated by a thermocouple placed in the center of the oven. The temperature of each capsule was estimated from the temperature so measured taken together with the temperature gradient found in the oven as determined in a subsequent test with a thermocouple on each capsule. After the exposure, the containers were allowed to decay in radioactivity for a few days and then were opened for inspection and analysis.

The irradiations were conducted in the Brookhaven Reactor (hole E-25). The combined flux existing in this facility was estimated as follows: for fast neutrons, neptunium–237 and uranium–238 fission monitors were employed (see Physics Review, vol. 94, pp. 969–73; 1954). Small aluminum disks containing about 0.5% cobalt, were used to measure slow and resonance neutrons by exposures in the bare or cadmium shielded condition. The gamma flux in the Brookhaven facility was measured with a simple calorimeter which consisted of a lead rod insulated everywhere but on one end. The temperature difference between two points in the rod depended upon the heat input from gamma radiation. By these means, the resonance neutron flux (about 0.5 ev. to 0.6 mev.) was determined to be approximately 10% of the subcadmium slow neutron flux (below about 0.5 ev.). Similarly, the fast neutron flux (above about 0.6 mev.) was shown to be approximately 25% of the subcadmium slow neutron flux. With the assumption of 1 mev. as the average energy of a reactor gamma photon, this flux was found to be about 45% of the subcadmium slow neutron flux. As these ratios hold for the various positions used in this particular facility, the combined reactor dosage or integrated flux will generally be expressed in terms of the more easily measured slow and resonance neutrons, even though these components are not the major contributors to damage. Thus, where dosage is shown hereinbelow as slow plus resonance neutrons per square centimeters, designated as "$n_s$(bare Co)/cm.$^2$," gamma radiation and fast neutrons are also present in the ratios indicated above.

In the following table are given the results of irradiations carried out in accordance with the procedure described above on compositions prepared in accordance with the present invention. The dosage was about $2\times10^{18}n_s$(bare Co)cm.$^2$. In the table are given the temperatures of the "lowest observed coking temperature" and "highest observed usable temperature." The former term refers to the temperature at which the test material is not longer liquid and is essentially a solid mass. The latter term means the highest test temperature at which the material was still a liquid in usable condition (i.e., probably not yet requiring make-up fluid), although small amounts of coke might be contained in the liquid material. Low values for "lowest observed coking temperature" are the limiting values; i.e., a temperature given under this heading indicates that coking will take place at any higher temperature. In the column labeled "highest observed usable temperature," the high values are the important ones, since a temperature given indicates that the fluid may be used at least at this temperature, but does not exclude the possibility of a test at a higher temperature showing that the fluid may be used at even higher temperatures.

*Table I*

| Test No. | Base Material | Additive | Lowest Observed Coking Temp. (° F.) | Highest Observed Usable Temp. (° F.) |
|---|---|---|---|---|
| 1 | 50% Biphenyl+50% m-Terphenyl. | 2% Naphthacene. | 840 | 740 |
| 2 | 77% o-Terphenyl+ 23% Phenanthrene. | ----do---- | | 625 |

EXAMPLE II

In another series of experiments, fluid samples were prepared and exposed as in Example I to a dosage of $2.5\times10^{18}n_s$(bare Co)/cm.$^2$. The viscosities of the irradiated samples were measured and compared to the viscosities of the unirradiated samples to calculate the index of viscosity change ($\eta_1$), as described hereinabove. Where the viscosities could not be readily measured, the observed condition of the test fluid was noted. The results are given in the following table:

Table II

| Test No. | Base Material | Additive | Temp. (° F.) | Index of Damage ($\eta_1$) |
|---|---|---|---|---|
| 3 | Biphenyl | None | 807 | Coked |
| 4 | do | 0.5% Phthalocyanine | 800 | 2.1 |
| 5 | do | do | 755 | 2.4 |
| 6 | do | 5% Triphenylmethane | 850 | 25.4 |

The data in Table II above illustrate that both phthalocyanine and triphenylmethane are successful in protecting polynuclear aromatics from the action of radiation. Phthalocyanine is especially effective, even at one-tenth the concentration used for other additives.

Although this invention has been described with particular emphasis upon the currently important application to use as primary or secondary coolants for reactor components in nuclear power plant services, it is inherently of much wider applicability. In pursuits other than power generation, where such coolant compositions are unprotectedly disposed in the proximity of neutronic reactors, the composition of the instant invention may likewise afford beneficial results. Moreover, aside from neutronic reactors, the compositions and procedures of the invention may be applied to resist damage from the same types of deleterious radiation, especially neutrons and gamma rays, emitted from other conventional radiation sources, such as radium-beryllium neutron sources, and nuclear reaction effected by means of Van de Graaff generator—energized linear accelerators, and cyclotrons and the like, particularly in such environments which are at high temperatures. Various additional applications of the hereinabove-disclosed method will become apparent to those skilled in the art. It is, therefore, to be understood that all matters contained in the above description and examples are illustrative only and do not limit the scope of the present invention.

We claim:

1. A composition of improved resistance to deterioration at elevated temperatures in the presence of nuclear radiation, said composition consisting essentially of a polyphenyl selected from the group consisting of biphenyl, metaterphenyl, orthoterphenyl, paraterphenyl and the quaterphenyls and a small amount of a metal-free aromatic inhibitor material capable of forming stable free radicals and selected from the group consisting of naphthacene, phthalocyanine and triphenylmethane.

2. The composition of claim 1, wherein said polyphenyl is biphenyl.

3. The composition of claim 1, wherein said metal-free material is phthalocyanine.

4. The composition of claim 1, wherein said inhibitor is triphenylmethane.

5. The method of improving the resistance of polynuclear aromatic hydrocarbons to deterioration at elevated temperatures in the presence of nuclear radiations which consists of adding to said polynuclear aromatic hydrocarbons from 0.1% to 10%, of a metal-free aromatic inhibitor material capable of forming stable free radicals and selected from the group consisting of phthalocyanine, naphthacene and triphenylmethane, wherein said polynuclear aromatic hydrocarbon is a polyphenyl selected from the group consisting of biphenyl, metaterphenyl, orthoterphenyl, paraterphenyl and the quaterphenyls.

References Cited in the file of this patent

International Critical Tables, First Edition, vol. IV, page 156, McGraw-Hill Book Co., New York, 1928.